June 19, 1928.                                                                   1,674,573
G. SALMONS ET AL
HOOD FITTING FOR MOTOR AND OTHER VEHICLES
Filed April 8, 1926          2 Sheets-Sheet 2
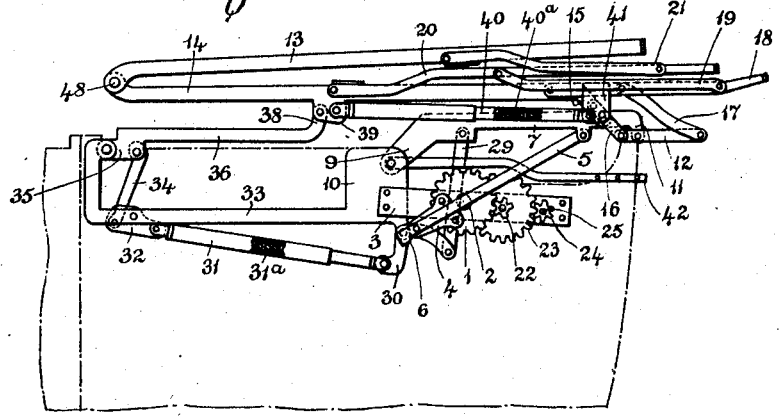
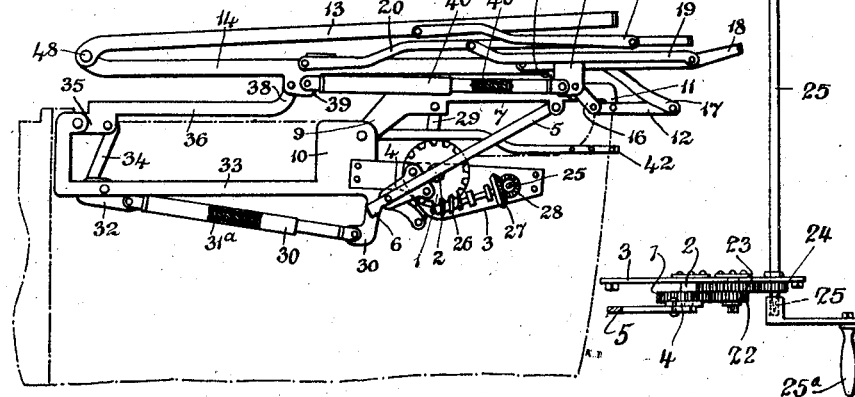
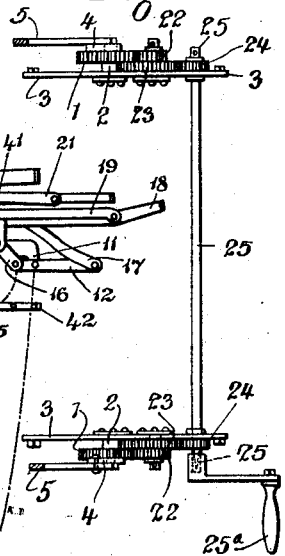
Inventors
George Salmons
Arthur H. Dalby-Ball
By
James L. Norris
Attorney Patented June 19, 1928.

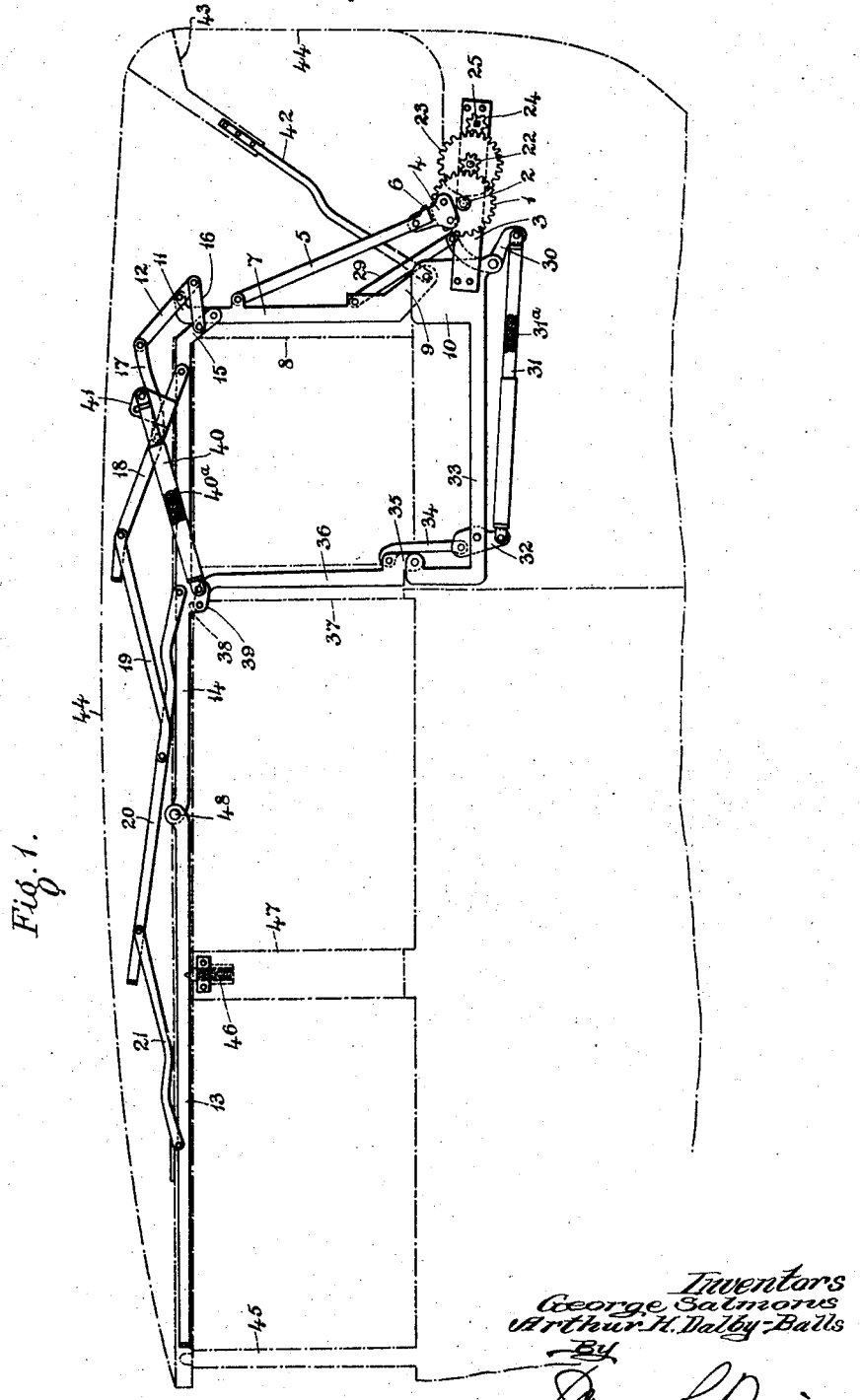

1,674,573

UNITED STATES PATENT OFFICE.

GEORGE SALMONS AND ARTHUR HENRY DALBY-BALLS, OF NEWPORT PAGNELL, ENGLAND; SAID DALBY-BALLS ASSIGNOR TO ARTHUR JAMES LUCAS SALMONS, OF NEWPORT PAGNELL, ENGLAND.

HOOD FITTING FOR MOTOR AND OTHER VEHICLES.

Application filed April 8, 1926, Serial No. 100,657, and in Great Britain July 22, 1925.

The object of this invention is to provide mechanism for raising and also lowering the hoods of motor cars or other vehicles by means of a crank handle.

According to the invention a gear wheel is fitted on each side of the rear of the vehicle body and pivotally carries a rod which is connected to the rear pillar fitting just below the cant rail line. A rocking lever is pivoted to the rear pillar fitting above the cant rail pivot and is pivotally connected at its lower end to the cant rail by a link and at its upper end to a rod hinged to the rear cant rail fitting. The last named rod is hingedly connected through a plurality of rods to the cant rail. Said link and rocking lever are pivoted above the pivot connecting the rear cant rail to the back pillar and the gear wheel on each side of the body of the vehicle is driven through variable toothed gearing or worm and gear or other suitable gearing from a shaft positioned across the back of the vehicle body and operable by a crank handle from the outside.

Suitable springs or buffers may be provided to assist in the raising and lowering of the hood and prevent rattle and vibration.

The invention will be clearly understood from the following description aided by the annexed drawings in which Figure 1 is a side elevation of one set of fittings and operating gears showing their position when the hood is closed, the body and hood being shown in dotted lines.

Figure 2 is a side elevation of the fittings shown in Figure 1 in position when the hood is open.

Figure 3 is a view similar to Figure 2 but showing an alternative gear.

Figure 4 is a plan view of the gear and a portion of each of the carrying plates.

It will be understood that only one set of fittings are shown and hereafter described but that two sets are employed, one on each side of the vehicle body and connected by hoopsticks in the usual manner, only the operating shaft extending across the back of the body to connect the gearing.

1 is a gear wheel mounted on a stub axle 2 projecting from a plate 3 supported at its forward end by the rear end of a plate 10 secured to the side of the vehicle body near the rear of the latter. The rear end of the plate 3 may be secured to the side of the vehicle body. The gear wheel 1 carries a plate 4 on which is pivoted a rod 5, such rod having at its pivoted end a stop piece or lug 6 which engages the edge of the plate to prevent further movement of the gear when the hood is closed.

The other end of the rod 5 is pivoted to the fitting 7 connected to the rear pillar 8 at a point below the cant rail line.

The rear pillar fitting 7 has an angled extension 9 at its lower end, which extension is pivoted to a bearing plate 10 secured to the vehicle body, the pivot being at a point below the base of the pillar and such fitting 7 carries at its upper end a rearward extension 11 to which is pivoted a rocking lever 12.

The front and back cant rail fittings 13, 14 are hinged together as usual, the hinge being preferably over the rear door, whilst the free end of the rear cant rail fitting 14 is angled at 15 and pivoted to the rear pillar fitting 7 at a point between the extension 11 of said pillar fitting and pivot of the rod 5. One end of a link 16 is pivotally connected to the extension 15 and the other end of said link is pivoted to the lower end of the rocking lever 12.

The rocking lever 12 is pivoted between its ends to the extension 11 of the rear pillar fitting 7 but nearer to its point of connection with the link 16 than its point of connection to the rod 17. The rod 17 is hinged to a rod 18 which is pivoted at its rear end to the rear cant rail fitting 14 near the rear extension 15 of the latter, and such rod 18 is also pivotally connected adjacent its forward end to the rear end of a rod 19 which in turn is pivotally connected at its forward end to a rod 20 between the ends of the latter. The rod 20 is pivotally connected at its rear end to the rear cant rail 14 and is also pivotally connected adjacent its forward end to the rear end of a rod 21, of which the forward end is connected to the front cant rail 13.

According to Figures 1 and 2 the gear wheel 1 meshes with a pinion 22 mounted on a gear wheel 23 and the gear wheel 23 is in mesh with a pinion 24 mounted on the shaft 25 which is rotated by a crank handle 25ª.

In Figure 3 the gear wheel 1 is shown as meshing with a worm 26 one end of which carries a bevel gear 27 meshing with a bevel pinion 28 on the shaft 25.

To the back pillar fitting 7 near its lower portion is pivoted one end of a rod 29, the lower end of which is pivoted to a rocking lever 30 which is fulcrumed on the plate 10. One of a pair of telescopic members 31 has its rear end pivotally connected to the other end of the lever 30 and the other telescopic member has its forward end pivotally connected to a rocking lever 32 fulcrumed on a forwardly extending arm 33 of the plate 10. A spring $31^a$ is interposed between the telescoping ends of the members 31. The rocking lever 32 has its other end connected by a link 34 to a projection 35 on the lower end of the centre pillar fitting 36. The fitting 36 carries the centre pillar 37 and its extension 35 is pivoted to the arm 33 of the plate 10 whilst the top portion of the centre pillar fitting 36 has an extension 38 which is pivoted to the projection 39 on the lower side of the cant rail fitting 14. The spring $31^a$ assists in opening the hood and also serves to prevent rattling and vibration when the hood is closed.

A telescopic tube 40, between the telescoping ends of which a spring $40^a$ is fitted, has one end connected to the projection 39 and its other end connected to a plate 41 on the rod 18.

42 is a rod hinged at its lower end to the plate 10 and at its upper end carries a hoopstick 43 fitting the rear upper corner of the hood. The other hoopsticks are connected to the free ends of the rods 18 and 20.

The ratio of the operating gear is preferably about twelve turns of the crank handle to one of the gear wheel 1 whereby an easy motion is obtained.

To open the hood from the position shown in Figure 1 catches (not shown) holding the front of the hood 44 to the wind screen pillar 45 are first released and then the spring plunger 46 mounted on the centre pillar 47 and bearing against the lower side of the front cant rail 13 will lift the cant rails 13 and front portion of the hood. A crank handle $25^a$ is then engaged in the ordinary manner with the end of the shaft 25 and moved to revolve the shaft 25 clockwise and through the connecting gear, will revolve the gear wheel 1 also clockwise. The plate 4 will move with the gear wheel 1 and pull on the rod 5, this in turn pulling down the rear and mid pillar and fittings 7, 36 which fall in parallel order.

During this movement the link 16 will have acted upon the rocking lever 12 which will have pulled the rod 17 rearwardly and this, in turn will have pulled the rods 18, 19, 20, 21, thus rocking the front cant rails 13 and their fittings on their pivot 48. At the same time the compression of the spring $40^a$ is released and, as the movement continues, the hood and fittings will be caused to be positioned next to each other with front cant rails on top and, at the finish of the movement they will occupy the position shown at Figures 2 or 3 with the spring $40^a$ relaxed or uncompressed.

During the movement just described the rod 29 will have rocked the rocking lever 30 on its fulcrum and the link 34 will have rocked the rocking lever 32 and, through the telescopic members 31, will have compressed the spring $31^a$ which will take the weight of the hood.

To close the hood the crank handle is moved anticlockwise and the intermediate gear 22 will move the gear wheel 1 also anticlockwise and the plate 4 will lift the rod 5 and raise the pillars and fittings 7, 36, and in so doing, the link 16 will act upon the rocking lever 12 and this will actuate the rod 17, and through the rods 18, 19, 20 and 21 push the front cant rail and fittings forwardly and thus reposition the front cant rails, the spring $40^a$ being compressed and taking the weight of the cant rails. By the time the pillars 8 and 37 have assumed their vertical position the lug 6 of the rod 5 will have engaged the plate 4 and prevented further movement of the crank handle. The hood will then be in position to have its forward end pulled down and secured to the wind screen pillars.

During this movement the rod 29 will have rocked the rocking lever 30 on its fulcrum and the centre pillar will have rocked the rocking lever 32 through the link 34 so as to release the compression of the spring $31^a$ which will counteract the action of the spring $40^a$, the spring $31^a$ assisting in preventing rattle and vibration.

In describing the operation, only one complete set of fittings are referred to, but it is to be understood, as before stated, that two sets of fittings, one on each side of the body, are employed and that they are connected by hoopsticks and work in unison.

We claim:—

1. A device of the character described including a vehicle body and hood therefor, a pair of plates positioned one at each side of said body and adjacent the rear end thereof, forwardly extending arms carried by said plates, a hoopstick, rods pivoted to said plates and fixed to the extremities of said hoopstick, a collapsible framework, pillar fittings pivotally connecting said framework with the front ends of said forwardly extending arms and the plates, cushioning means between said front pivoted pillar fittings and said framework, a second cushioning means between said front and rear pillar fittings and having link connections with said forwardly extending arms and plates, gearing carried by said body and operatively connected to one set of said pillar fittings for raising and lowering said hood, and manually operable means for operating said gearing.

2. In a hood fitting for motor and other vehicles, a pair of plates for attachment, respectively, to the opposite sides of the body of a vehicle lengthwise of said body, a pair of front top-supporting pillars each hinged at its lower end to one of said plates adjacent the forward end of the latter, a pair of rear top-supporting pillars each hinged at its lower end to one of said plates adjacent the rear end of the latter, a pair of levers fulcrumed on each of said plates below and rearwardly of the lower ends of said front and rear pillars, respectively, a link connecting one arm of each of said levers to the adjacent pillar, and means connecting the other arms of said levers, said means being yieldable when said levers are rocked by the movement of said pillars during the folding of the top.

3. A hood fitting according to claim 2 wherein the means connecting one arm of one lever to one arm of another lever comprises a pair of telescopic rods.

4. In a hood fitting for motor and other vehicles, a pair of plates for attachment, respectively, to the opposite sides of the body of a vehicle lengthwise of said body, a pair of front top-supporting pillars each hinged at its lower end to one of said plates adjacent the forward end of the latter, a pair of rear top-supporting pillars each hinged at its lower end to one of said plates adjacent the rear end of the latter, a pair of front cant rails, a pair of rear cant rails each hinged at its forward end to one of said front cant rails and hinged at its rear end to one of the rear pillars and also hinged between its ends to one of the front pillars, a lever fulcrumed at the upper end of each of the rear pillars, a foldable framework connecting said front and rear cant rails and comprising a pair of rods each hinged at its rear end to one of the rear cant rails adjacent the rear end of the latter, a link connecting one arm of each of said levers to one of said rear cant rails adjacent the point of connection of the latter to a rear pillar, a link connecting the other arm of each of said levers to one of said rods, and means connecting each of the front pillars to one of said rods between the points of connection of the latter with its associated rear cant rail and link. said means being yieldable when said pillars are moved into erected position.

5. A hood fitting according to claim 4 wherein the means connecting the front pillars to the rods comprises a plurality of telescoping members.

6. A hood fitting for motor and other vehicles, comprising a pair of plates for attachment, respectively, to the opposite sides of the body of a vehicle lengthwise of such body; a pair of front top-supporting pillars each hinged at its lower end to one of said plates; a pair of rear top-supporting pillars each hinged at its lower end to one of said plates rearwardly of said front pillars; a pair of levers fulcrumed on each of said plates below and rearwardly of the lower ends of said front and rear pillars, respectively; a link connecting one arm of each of said levers to the adjacent pillar; a pair of front cant rails; a pair of rear cant rails each hinged at its forward end to one of said front cant rails and at its rear end to one of the rear pillars and also hinged between its ends to one of the front pillars; a lever fulcrumed at the upper end of each of the rear pillars; a framework connected to said front and rear cant rails and foldable therewith, said framework comprising a pair of rods each hingedly connected at its rear end to one of the rear cant rails adjacent the rear end of the latter; a link connecting one arm of each of said last-named levers to one of said rear cant rails adjacent the point of connection of the latter to a rear pillar; a link connecting the other arm of each of said last-named levers to one of said rods; a rotatable member supported by a member extending rearwardly from one of said plates; and a link associated with said rotatable member and with one of said pillars and operative by the rotation of said rotatable member in one direction to move said pillar into a substantially vertical position and by the rotation of said rotatable member in the opposite direction to move said pillar into a substantially horizontal position.

In testimony whereof they have hereunto set their hands.

GEORGE SALMONS.
ARTHUR HENRY DALBY-BALLS.